(12) United States Patent
Muramatsu et al.

(10) Patent No.: US 11,953,757 B2
(45) Date of Patent: Apr. 9, 2024

(54) EYEWEAR

(71) Applicant: Mitsui Chemicals, Inc., Tokyo (JP)

(72) Inventors: Akihiro Muramatsu, Marugame (JP); Masayoshi Hino, Saijo (JP)

(73) Assignee: Mitsui Chemicals, Inc., Tokyo (JP)

( * ) Notice: Subject to any disclaimer, the term of this patent is extended or adjusted under 35 U.S.C. 154(b) by 783 days.

(21) Appl. No.: 17/040,061

(22) PCT Filed: Jan. 11, 2019

(86) PCT No.: PCT/JP2019/000691
§ 371 (c)(1),
(2) Date: Sep. 22, 2020

(87) PCT Pub. No.: WO2019/181150
PCT Pub. Date: Sep. 26, 2019

(65) Prior Publication Data
US 2021/0026157 A1    Jan. 28, 2021

(30) Foreign Application Priority Data

Mar. 22, 2018   (JP) .................................. 2018-055006

(51) Int. Cl.
| | |
|---|---|
| G02C 11/00 | (2006.01) |
| G02C 5/06 | (2006.01) |
| G02C 5/16 | (2006.01) |
| G02C 7/08 | (2006.01) |
| G02F 1/29 | (2006.01) |

(52) U.S. Cl.
CPC .............. *G02C 11/10* (2013.01); *G02C 5/06* (2013.01); *G02C 5/16* (2013.01); *G02C 7/083* (2013.01); *G02F 1/29* (2013.01)

(58) Field of Classification Search
USPC .................................................. 351/114, 158
See application file for complete search history.

(56) References Cited

U.S. PATENT DOCUMENTS

| | | | |
|---|---|---|---|
| 3,825,700 A * | 7/1974 | Jerry ...................... | G02C 11/06 |
| | | | 381/330 |
| 5,781,272 A | 7/1998 | Bright | |
| 2014/0028966 A1 | 1/2014 | Blum | |

(Continued)

FOREIGN PATENT DOCUMENTS

| | | |
|---|---|---|
| FR | 3027412 A1 | 4/2016 |
| JP | 58-067313 U | 5/1983 |
| JP | 58-128412 U | 8/1983 |

(Continued)

OTHER PUBLICATIONS

International Search Report from International Application No. PCT/JP2019/000691, dated Feb. 12, 2019.

*Primary Examiner* — Darryl J Collins
(74) *Attorney, Agent, or Firm* — Shih IP Law Group, PLLC.

(57) ABSTRACT

The eyewear according to the present invention comprise: a lens having an electrical element; a hollow temple for holding the lens; a control unit for controlling the electrical element; an electronic component electrically connected to the control unit through a wire; and a hollow member arranged inside the temple while storing the wire inside, the hollow member deforming after the deformation of an ear hook when the ear hook is deformed to make a fit.

7 Claims, 5 Drawing Sheets

(56) References Cited

U.S. PATENT DOCUMENTS

2019/0041666 A1* 2/2019 Abele .................... G02B 27/00
2021/0247617 A1* 8/2021 Kassner .................. G02C 9/04

FOREIGN PATENT DOCUMENTS

| JP | 05-045637 U | 6/1993 |
| JP | 2009-092946 A | 4/2009 |
| JP | 2015-522842 A | 8/2015 |
| JP | 2017-134100 A | 8/2017 |

* cited by examiner

EYEWEAR

TECHNICAL FIELD

The present invention relates to eyewear comprising a lens having an electrical element.

BACKGROUND ART

When wearing eyewear such as glasses or sunglasses, fitting (position adjustment) of each part of the frame is important for the user to obtain a good feeling of wearing. In order to improve the feeling of wearing, for example, PTL 1 discloses a technique that can easily adjust the angle of a modern (a tip portion of a temple) which is a part of a frame.

In PTL 1, a hollow cylindrical portion is formed at the rear end portion of the temple, a coil spring is provided in the hollow cylindrical portion, a coupling shaft portion is of the modern is inserted into the hollow cylindrical portion of the temple in a state that both ends of the coil spring are connected to the bottom portion of the hollow cylindrical portion and the coupling shaft portion of the modern. With such a configuration, the position of the modern can be freely adjusted in the direction around the temple axis.

CITATION LIST

Patent Literature

PTL1 Japanese Patent Application Laid-Open No. 2009-92946

SUMMARY OF INVENTION

Technical Problem

In recent years, eyewear equipped with a lens having an electric element has been used in various applications. In such eyewear, for example, the refractive index, color, polarization state and/or the like of the lens can be changed by controlling the electric element. In the eyewear equipped with the lens having such the electrical element, it is necessary to form the hollow frame with, for example, a resin and/or the like to pass wiring for supplying electric power to the electrical element. Although the strength of the frame formed hollow by resin and/or the like is low, the strength can be ensured by disposing a hollow member such as a metal pipe in the frame, for example. The wiring can be protected by passing the wiring in the metal pipe.

In the eyewear equipped with the lens having such the electric element, in the case that the fitting of each portion of the frame is required, fitting is performed by applying heat to softening the resin frame, and by deforming by applying a force to the softened frame. There is a problem that when the metal pipe is disposed inside the frame, it is necessary to deform the metal pipe together with the frame, the time and effort required for fitting is increased. In the case that fitting is necessary multiple times, bending habits caused by deforming multiple times in the metal pipe may occur to adversely affect the outer shape of the frame.

There is a demand for a configuration so that fitting of the frame can be performed preferably in the eyewear with the lens having the electric element.

In view of the above circumstances, it is an object of the present invention to provide an eyewear with a lens having an electric element, in which fitting of a frame can be preferably performed.

Solution to Problem

An eyewear according to the present invention includes: a lens including an electrical element; a frame which holds the lens and is partially formed hollow; a control unit for controlling the electrical element; an electronic component electrically connected to the control unit via wiring; and a hollow member which is disposed within the frame in a state of housing the wiring therein and deforms by following deformation of the frame.

An eyewear according to the present invention includes: a lens including an electrical element; a frame which holds the lens and is partially formed hollow; a control unit for controlling the electrical element; an electronic component electrically connected to the control unit via wiring; and a flexible tube which is disposed within the frame in a state of housing the wiring therein and deforms by following deformation of the frame.

Advantageous Effects of Invention

According to the present invention, it is possible to preferably perform fitting of a frame in an eyewear with a lens having an electric element.

DESCRIPTION OF EMBODIMENTS

Hereinafter, eyewear according to an embodiment of the present invention will be described with reference to the drawings.

In the present invention, the term "eyewear" means an appliance used by being worn on the eyes for visual acuity correction, eye protection, viewing of images, and/or the like. In the present invention, the term "eyewear" includes a VR glass for experiencing a virtual space (VR)/augmented reality (AR), a smart glass/headset for displaying images, and/or the like, in addition to glasses/sunglasses for visual acuity correction and/or the like. In the following description, as an example of eyewear, an electron glasses with a lens including an electroactive region whose optical properties can be changed by electrical control will be described.

[Composition of Electronic Glasses]

Figure 1:
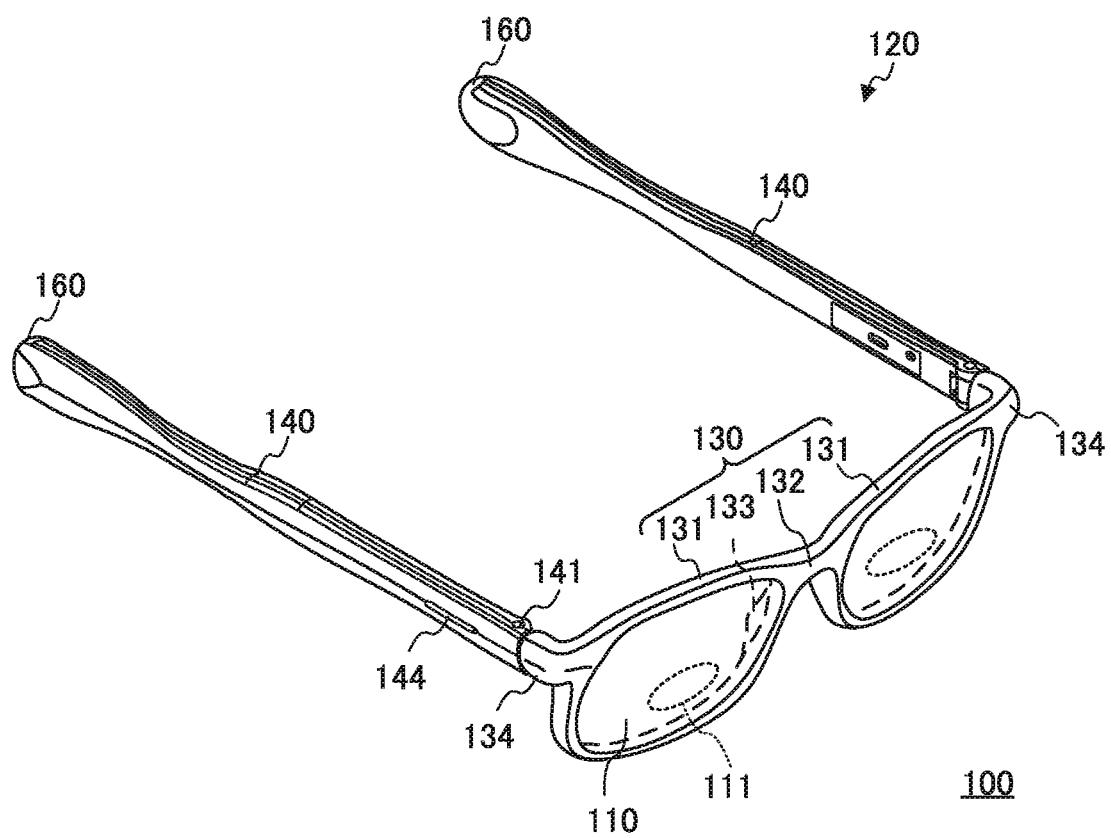
FIG. 1 is a perspective view illustrating an example of a configuration of electronic glasses according to the present embodiment.

FIG. 1 is a perspective view illustrating an example of a configuration of electronic glasses 100 according to the present embodiment. Electronic glasses 100 have a pair of lenses 110, frame 120, and electronic components 160. Frame 120 has front 130 and a pair of temples 140. In the following description, the portion in which front 130 is disposed will be described as the front of electronic glasses 100.

1) Lens

A pair of lenses 110 are formed so as to be symmetrical when viewed from the front of electronic glasses 100, and have the same components to each other.

Lens 110 has liquid crystal lens 111 and a pair of electrodes (not illustrated). Liquid crystal lens 111 has a multilayer structure, at least a pair of conductive layers sandwiching the liquid crystal layer (not illustrated) from the front and rear (not illustrated). A pair of conductive layers are connected to the electrodes, respectively. When a voltage is applied between a pair of conductive layers, the liquid crystal layer is activated and the refractive index of liquid crystal lens 111 is changed. As the electrode, a transparent electrode such as ITO is used. Liquid crystal lens 111 is an example of the electric element of the present invention, and may be a display device and/or the like.

Lens 110 is formed so as to have a shape suited to the shape of rim 131 described later by being cut out from the lens blank.

2) Front

As illustrated in FIG. 1, front 130 holds a pair of lenses 110. Front 130 has a pair of rims 131 supporting a pair of lenses 110 respectively, and bridge 132 connecting the pair of rims 131 to each other. The shape of rim 131 is shaped to correspond to the shape of lens 110. Bridge 132 has a pair of nasal pads 133 that can contact the user's nose. Although not illustrated in particular, wiring for electrically connecting the electrode of lenses 110 and control unit 150 to be described later are disposed within front 130.

The material of front 130 configuring frame 120 is not limited in particular, a material having thermoplasticity and capable of adjusting the position and shape of each portion if necessary is preferred. As the material of front 130, a known material which is used as a material of the front of the glasses may be used. Examples of the material of front 130 include polyamide, acetate, carbon, celluloid, polyetherimide, and urethane.

Front 130 has closing blocks 134 near both ends thereof. Closing block 134 is a portion extending leftward or rightward and rearward as viewed from rim 131. The rearward tip portion of closing block 134 is connected to temple 140 by hinge 141.

3) Temple

The pair of right and left temples 140 are formed so as to have a substantially left-right symmetrical outer shape at electronic glasses 100. As illustrated in FIG. 1, temple 140 is rotatably connected to front 130 at hinge 141 at the front end of temple 140. Note that the term "front" or "back" in the following description of temple 140 means front or back in the state that temple 140 is deployed (as illustrated in FIG. 1 to FIG. 3).

The material of temple 140 configuring frame 120 is not limited in particular, a material having thermoplasticity and capable of adjusting the position and shape of each portion if necessary is preferred, such as a resin. As the material of temple 140, a known material which is used as a material of the temple of the glasses may be used, for example, the same material as the example of the material of front 130. By using a transparent or semi-transparent material as the material of temple 140, for example, it is possible to confirm the state of the fitting and the bending state of coil spring 200 described later from the outside. In the state that a logo, mark, or pattern is performed on coil spring 200, manufacturing information, product information, serial number, bar code or the like is printed, it is also possible to improve the design of temple 140, or to utilize the traceability improvement or forgery prevention countermeasure of the product.

Figure 2:
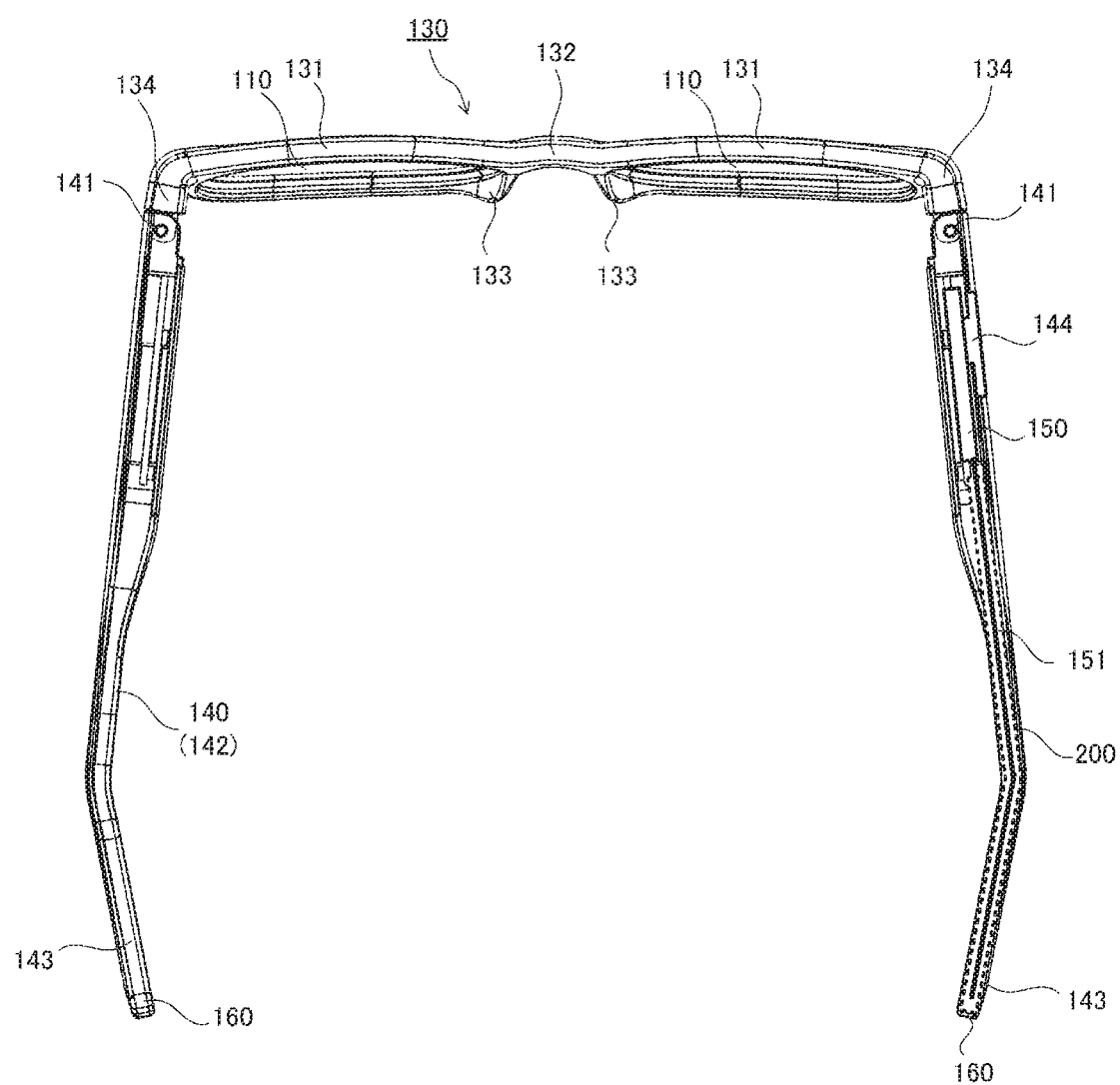
FIG. 2 is a plan view and partial perspective view of electronic glasses.
Figure 3:
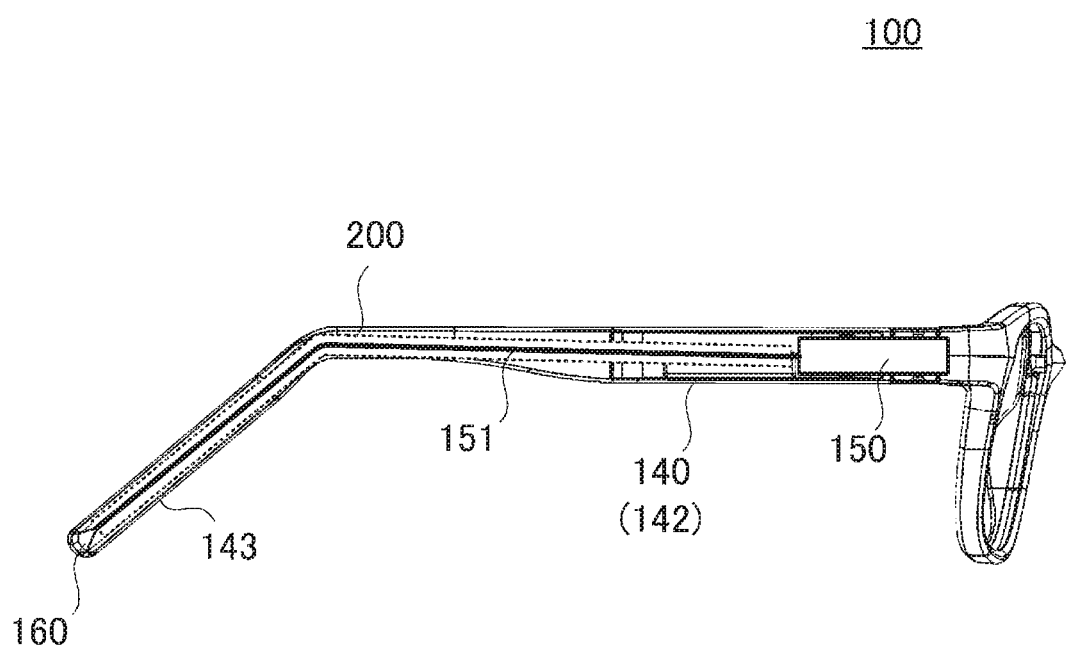
FIG. 3 is a partial perspective view of electronic glasses as viewed from the right side.

As illustrated in FIG. 2 and FIG. 3, the outer shape of temple 140 is constituted by housing 142. Housing 142 houses control unit 150, wiring 151, and coil spring 200. FIG. 2 is a plan view and partial perspective view of electronic glasses 100. FIG. 3 is a partial perspective view of electronic glasses 100 as viewed from the right side. In FIG. 2 and FIG. 3, control unit 150, wiring 151, and coil spring 200 housed in housing 142 of temple 140 are illustrated in the perspective state of housing 142. In FIG. 2, control unit 150, wiring 151, and coil spring 200 are illustrated on only the right side of temple 140 as viewed from the user of electronic glasses 100.

Ear hooking portion 143 is formed in the vicinity of the rear end portion of temple 140. In this embodiment, ear hooking portion 143 is integrally molded as a part of housing 142 of temple 140, the present invention is not limited thereto. Ear hooking portion 143 may be formed separately from the same or different material as housing 142, and may be attached to the rear end portion of temple 140.

As illustrated in FIG. 1 and FIG. 2, contacted portion 144 is provided in the vicinity of the front end of temple 140. Contacted portion 144 is, for example, a portion that may be contacted by an object such as a finger of the user to operate electronic glasses 100. As illustrated in FIG. 1, at least a part of contacted portion 144 is disposed so as to be exposed to the outside of housing 142.

The position of contacted portion 144 is preferably a position at which the user of electronic glasses 100 can easily touch contacted portion 144. From this point of view, contacted portion 144 is disposed on the front side from the midpoint in the longitudinal direction of housing 142. Contacted portion 144 is disposed on the outer surface in housing 142 as viewed from the user of electronic glasses 100.

The shape of contacted portion 144 is not limited in particular. In this embodiment, contacted portion 144 extends along the longitudinal direction of housing 142.

Although not limited in particular, contacted portion 144 is, for example, a capacitive touch sensor or a mechanical switch. In this embodiment, as an example, a case where contacted portion 144 is the capacitive touch sensor will be described. In this case, the contact with contacted portion 144 of the object as a conductor is electrically transmitted to control unit 150. Contacted portion 144 has conductivity. Examples of materials for contacted portion 144 include gold, silver, copper, aluminum, and alloys thereof. In this case, it is preferable that the material of at least the peripheral portion (for example, temple 140) of contacted portion 144 is insulative.

4) Control Section

Control unit 150 is constituted by, for example, a CPU and/or the like. Control unit 150 controls the detection of a change in capacitance in contacted portion 144, and the application of a voltage to liquid crystal lens 111. When, for example, contacted portion 144 detects the contact of the object, control unit 150 performs control to apply a voltage to liquid crystal lens 111, or to stop the application of the voltage, so as to switch the refractive index of liquid crystal lens 111. For example, in the case that the electrical element of the present invention is a display device (not illustrated), when contacted portion 144 detects the contact of the object, control unit 150 performs control to display an image and/or the like, by applying a voltage to the display device and by transmitting an information signal such as a video, or performs to display the video to the display device or to switch the display of the image, by stopping the transmission of the voltage application and information signal. Control unit 150 performs operation and control of various electronic components 160 described later.

Control unit 150 is housed in the vicinity of the front end portion of housing 142.

5) Wiring

Wiring 151 electrically connects control unit 150 and electronic component 160. Wiring 151 is, for example, a covered wire or a flexible printed circuit (FPC) covering the periphery of the conductor with an insulating covering member. As illustrated in FIG. 2 and FIG. 3, wiring 151 is housed in an insulated state within coil spring 200 formed in a cylindrical shape.

6) Electronic Components

Electronic component 160 is a various electronic component related to the function of electronic glasses 100. An example of electronic component 160 is as follows: for example, an electric power source for supplying electric power to control unit 150 and liquid crystal lens 111, a memory (including a reader/writer for reading or writing external storage devices such as a flash memory and a memory card) as a storage storing various information, a wireless communication device as a communication unit for providing a wireless communication function such as a Wi-Fi, a Bluetooth (registered trademark), and a NFC (Near Field Communication), a second control unit (e.g., a device for controlling electronic devices when liquid crystal lens 111 is replaced with an electrochromic lens that changes or dims the color of the lens by applying a voltage, or when a camera described later, microphone, liquid crystal display, and/or the like are operated or controlled) performs different control from control unit 150 (a device that controls to apply the voltage to liquid crystal lens 111, or to stop the application of the voltage, so as to switch the refractive index of liquid crystal lens 111.) described above, a second contacted portion (a second touch sensor unit), a camera, a microphone, and a speaker (including a bone conduction type speaker in addition to a conventional speaker that emits sound), a hearing aid (a sound collector), and various sensors (an acceleration sensor, tilt sensor, heart rate sensor, GPS, thermometer, myoelectric sensor, and/or the like).

As a use mode of electronic glasses 100 with electronic component 160 exemplified as described above, for example, the following mode can be considered. That is, for example, the mode that control unit 150 acquires the activity state (information on the movement and position of the user obtained by the acceleration sensor, tilt sensor, GPS, and/or the like) of the user and the body state (information on the body and the health state of the user obtained by the heart rate sensor, thermometer, myoelectric sensor, and/or the like) obtained based on various sensors at all times or in a suitable time, stores them in the memory, and stores or updates the information acquired in the external network or the electronic device (a smartphone, wearable terminal, and/or the like of the user) via the wireless communication device. According to such a use mode, the usefulness of electronic glasses 100 is greatly improved.

In FIG. 1 to FIG. 3, as electronic component 160, the electric power source which is a rechargeable battery pack detachably held at the rear end portion of housing 142 is illustrated. Examples of electric power source include nickel-metal hydride rechargeable battery, lithium-ion rechargeable battery, and solar cell. In FIG. 1 to FIG. 3, although illustrating an example in which electronic component 160 as the detachable battery pack is held at the rear end of housing 142, the position where electronic component 160 is disposed is not limited in particular in the present invention. For example, in the case that electric component 160 is the memory, wireless communication device, second control unit, or the like, it may be disposed at the same position as control unit 150. In the case that electronic component 160 is the camera, microphone, speaker, hearing aid, various sensors, or the like, electronic component 160 may be disposed at the position corresponding to each purpose. For example, the camera or microphone may be disposed in a part of front 130, the speaker or hearing aid may be disposed in a part of ear hooking portion 143, and/or the like.

7) Coil Spring

Coil spring 200 is a spring formed in a hollow tube shape, and, for example, is formed in a cylindrical shape. Coil spring 200 is an example of the hollow member of the present invention. As illustrated in FIG. 2 and FIG. 3, although not limited in particular, coil spring 200 is, for example, disposed from the rear side of control unit 150 to the rear end portion of housing 142, i.e. the tip portion of ear hooking portion 143, in the interior of housing 142.

As described above, wiring 151 is housed in a state of being insulated from coil spring 200 within coil spring 200. With this configuration, wiring 151 for connecting control unit 150 housed in the vicinity of the front end portion of housing 142 and electronic component 160 attached to the rear end portion of and housing 142 is physically protected by coil spring 200. Coil spring 200 should be disposed within housing 142, at least, in a portion of the region of temple 140 of electronic glasses 100 to be bent for fitting to the user.

Coil spring 200 is formed of metal. By disposing coil spring 200 within housing 142, the strength of temple 140 is ensured.

Coil spring 200 also has elasticity. In the case adjustment (fitting) for fitting ear hooking portion 143 to the ear shell is required, coil spring 200 is easily elastically deformed following housing 142.

Figure 4:
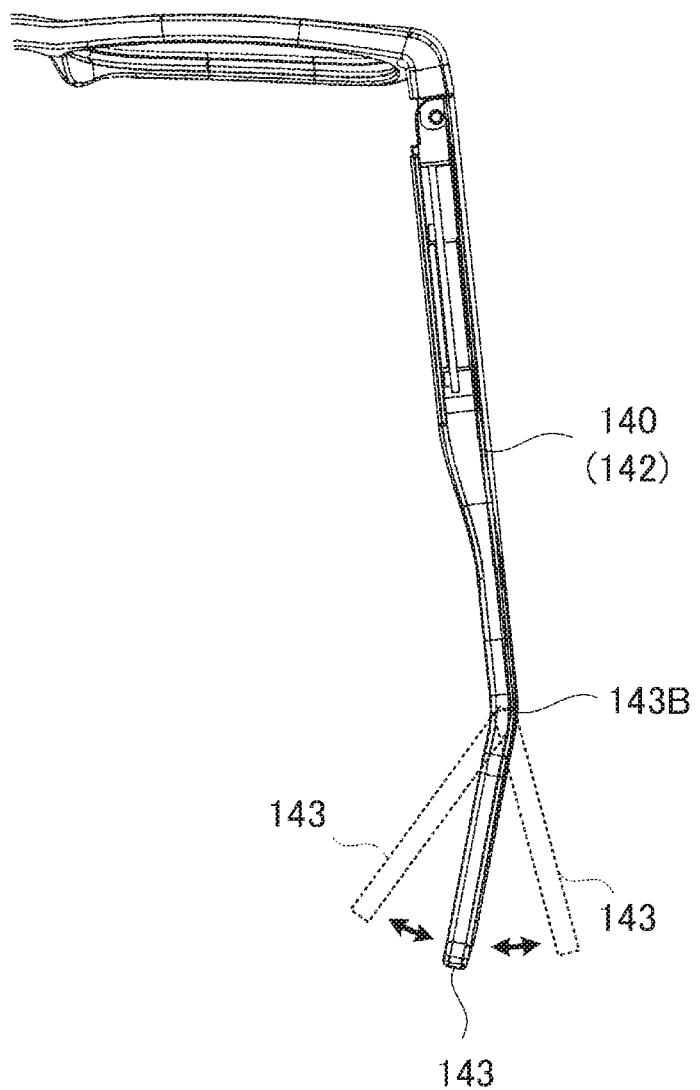
FIG. 4 is a diagram for explaining a change in the position of ear hooking portion in the case that a force is applied to ear hooking portion from the outside for fitting ear hooking portion.

FIG. 4 is a diagram for explaining a change in the position of ear hooking portion 143 in the case that a force is applied to ear hooking portion 143 from the outside for fitting ear hooking portion 143. FIG. 4 is a plan view of electronic glasses 100. As illustrated in FIG. 4, during fitting of ear hooking portion 143, ear hooking portion 143 is deformed inwardly or outwardly in the plan view of electronic glasses 100. This can adjust so-called holding angle suitably.

Coil spring 200 is easily elastically deformed following the deformed ear hooking portion 143. The presence of coil spring 200 does not easily hinder the fitting of ear hooking portion 143, and the fitting of ear hooking portion 143 can be suitably performed. Since the deformation of coil spring 200 is an elastic deformation, the bending habit does not remain even if the fitting of ear hooking portion 143 is performed a plurality of times, a situation that affects the outer shape of temple 140 by bending habit is avoided.

Although FIG. 4 exemplifies a case where the holding angle is adjusted by deforming ear hooking portion 143 outward or inward when viewed from the user, in the plan view of electronic glasses 100, the present invention is not limited to this. For example, so-called drop angle may be adjusted by deforming temple 140 upward or downward. Both of the holding angle and the drop angle may be adjusted simultaneously.

As an example of a manufacturing method of housing 142 in which coil spring 200 is disposed inside, for example, insert molding can be given. By inserting coil spring 200 in advance into a mold (not illustrated) formed in accordance with the outer dimensions of housing 142 and molding by injecting a material into the periphery thereof, housing 142 in which coil spring 200 is disposed inside can be manufactured.

Effect

As described above, electronic glasses 100 according to the embodiment of the present invention includes lens 110 with liquid crystal lens 111, temple 140 which holds lens 110 and is formed hollow, control unit 150 for controlling liquid crystal lens 111, electronic component 160 which is electrically connected to control unit 150 via wiring 151, and coil spring 200 which is disposed within temple 140 in a state of housing wiring 151 therein, and deforms elastically following the deformation of ear hooking portion 143 when ear hooking portion 143 is deformed for fitting.

With such a configuration, it is possible to protect wiring 151 physically, and to ensure the strength of temple 140, by coil spring 200. When the fitting of ear hooking portion 143, coil spring 200 elastically deforms following housing 140, so that it is possible to perform the fitting of ear hooking portion 143 preferably. Even if the fitting of ear hooking portion 143 is performed a plurality of times, bending habit does not remain because the deformation of coil spring 200 is an elastic deformation, a situation that affects the outer shape of temple 140 by bending habit is avoided.

Variation

While the embodiment of the present invention has been described above with reference to the accompanying drawings, the present invention is not limited to such example. It is obvious that various examples of variations or modifications can be conceived by the person skilled in the art within the scope of the claims, and it is understood that they belong to the technical scope of the invention of course. The components in the above embodiment may be arbitrarily combined without departing from the spirit of the invention.

In the embodiment described above, coil spring 200 is illustrated as an example of a hollow member for ensuring the strength of temple 140, protecting wiring 151, and fitting ear hooking portion 143 preferably, the present invention is not limited to this. For example, instead of coil spring 200, a flexible tube may be adopted in which an annular member made of a metal or a resin of which cross section is formed in an S-shaped, a metal plate or resin plate is processed into a wave shape in the cross section, or a metal tube or resin tube is processed into a bellows shape. Instead of coil spring 200, a flexible tube being formed of a thin metal plate or thin resin plate in a tube shape and having gaps of a predetermined width along the longitudinal direction may be disposed within temple 140. Even in the case that such a member is disposed within temple 140, it is possible to obtain the same effect as the case of employing coil spring 200. As the hollow member, for example, a material other than metal, such as a pipe-shaped resin, may be used. In this case, the hollow member may not have elasticity. In the case that the material other than metal such as resin is used as the hollow member, although the same material as that of temple 140 may be used, for example, a material having a physical property different from that of temple 140 may be used. In this case, for example, by using a resin material having a higher flexural modulus or Young's modulus than the resin material of temple 140 for the hollow member, it is possible to improve the stability of the fitting. By using a resin material having a lower flexural modulus or Young's modulus than the resin material of temple 140 for the hollow member, the ease of fitting can be improved.

Figure 5A:
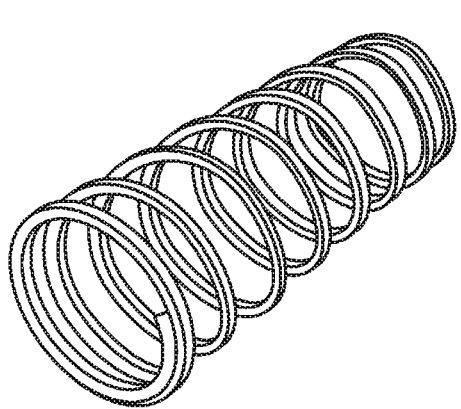
FIG. 5A is a perspective view illustrating coil spring.
Figure 5B:
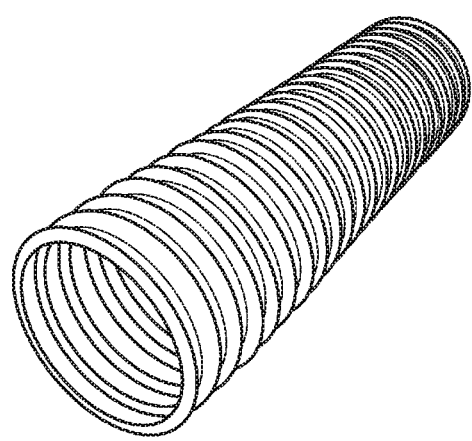
FIG. 5B is a perspective view of a flexible tube.
Figure 5C:
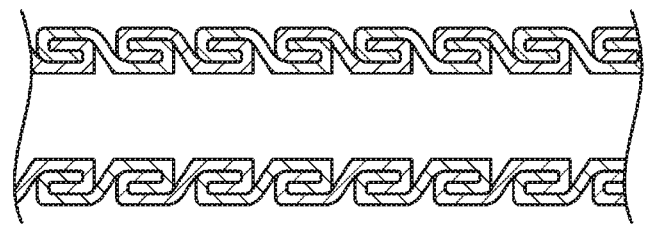
FIG. 5C is a cross-sectional view of a flexible tube connecting the metal annular member of which cross section is formed in an S-shape.
Figure 5D:
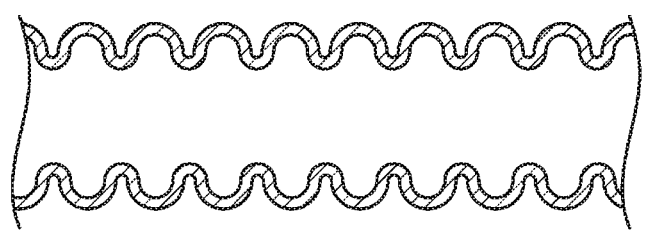
FIG. 5D is a cross-sectional view of a flexible tube in which a metal plate or resin plate is processed into a wave shape in the cross section (accordions type, i.e., bellows)
Figure 5E:
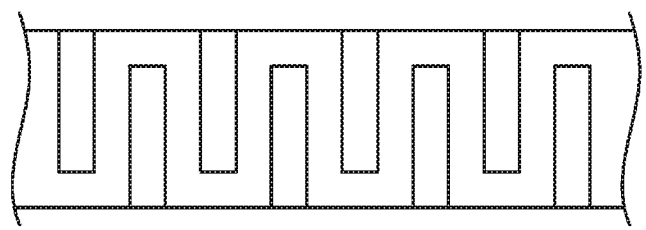
FIG. 5E is a side view of a flexible tube which is a member made by forming a thin metal plate in a tube shape and have gaps (slits) of a predetermined width along the longitudinal axis.

FIG. 5A to FIG. 5E are diagrams illustrating a configuration for ensuring the strength of temple 140, protecting wiring 151, and fitting ear hooking portion 143 preferably, including coil spring 200 of the embodiment described above. FIG. 5A is a perspective view illustrating coil spring 200. FIG. 5B is a perspective view of a flexible tube. FIG. 5C is a cross-sectional view of a flexible tube connecting the metal annular member of which cross section is formed in an S-shape. FIG. 5D is a cross-sectional view of a flexible tube in which a metal plate or resin plate is processed into a wave shape in the cross section (accordions type, i.e., bellows). FIG. 5E is a side view of a flexible tube which is a member made by forming a thin metal plate in a tube shape and have gaps (slits) of a predetermined width along the longitudinal axis. Electronic glasses 100 according to the embodiment of the present disclosure can ensure the strength of temple 140, protect wiring 151, and fit ear hooking portion 143 preferably, by using any of the configurations illustrated in FIG. 5A to FIG. 5E. Although not illustrated, for example, a coaxial cable may be adopted as an example of a mode in which the flexible tube and wiring 151 are closely adhered to or integrally formed with each other.

In the embodiment described above, since wiring 151 is disposed within coil spring 200 from the viewpoint of protection of wiring 151, coil spring 200 is disposed from the rear side of control unit 150 to the rear end portion of housing 142, i.e. the tip portion of ear hooking portion 143. However, the present invention is not limited to this. In the present invention, as illustrated in FIG. 4, when the deformation is performed in the rotational direction of which fulcrum is a part of temple 140 during fitting of ear hooking portion 143, coil spring 200 should be disposed at a point serving as the fulcrum. The fulcrum of deformation of ear hooking portion 143 is the base of ear hooking portion 143, i.e. the vicinity of the position where ear hooking portion 143 begins to bend in accordance with the shape of ear shell of the user (bent portion 143B illustrated in FIG. 4).

In the case where coil spring 200 is disposed only in the vicinity of bent portion 143B of ear hooking portion 143, for example, a metal pipe (not illustrated) may be disposed inside at other portions of temple 140. A mode that coil spring 200 and the metal pipe is connected can be adopted. As a result, the strength of temple 140 can be ensured more preferably, and wiring 151 can be protected more preferably. With such a configuration, fitting of ear hooking portion 143 can be performed preferably, sufficient strength of temple 140 can be ensured, and wiring 151 can be physically protected. Even if the fitting is performed a plurality of times, a situation in which the external shape of temple 140 is affected by the bending habit is avoided.

In the embodiment described above, coil spring 200 is disposed within temple 140 for the purpose of fitting ear hooking portion 143 preferably. The present invention is not limited to this. Coil spring 200 may be configured to perform fitting of not only ear hooking portion 143 but entire temple 140. In this case, it is desirable that coil spring 200 is disposed at a place of temple 140 which becomes a fulcrum of deformation at least of a part of which adjustment is required.

Coil spring 200 may also be disposed in other than temple 140 of frame 120. Coil spring 200 may be disposed within bridge 132, for example. With this configuration, in a plan view of electronic glasses 100, it is possible to deform such as to change the angle formed by right and left rims 131 connected by bridge 132. As a result, it possible to perform fitting so as to improve the appearance and the comfort of wearing of electronic glasses 100.

In the embodiment described above, wiring 151 is housed within coil spring 200 formed in a tube shape, and control unit 150 is not housed. The present invention is not limited to this. If the outer dimensions of housing 142 is allowed in designing, control unit 150 may be housed within coil spring 200. In this case, it is more preferable because control unit 150 which is for example a circuit board can be physically protected by coil spring 200.

In the above-described embodiment, in FIG. 2, control unit 150, wiring 151, and coil spring 200 are illustrated only in temple 140 of the right side as viewed from the user of electronic glasses 100. In the present invention, a similar configuration may be disposed in temple 140 on the left side also. In the case that control unit 150 is disposed only in one of the right and left temples 140, in temple 140 of the side in which control unit 150 is not disposed, coil spring 200 may be disposed along the longitudinal direction of temple 140 entirely.

This application is entitled to and claims the benefit of Japanese Patent Application No. 2018-055006 filed on Mar. 22, 2018, the disclosure of which including the specification, drawings and abstract is incorporated herein by reference in its entirety.

INDUSTRIAL APPLICABILITY

The present invention is suitable as an eyewear with a lens having an electric element.

REFERENCE SIGNS LIST

100 Electronic glasses
110 Lens
111 Liquid crystal lens
120 Frame
130 Front
131 Rim
132 Bridge
133 Nasal pad
134 Closing block
140 Temple
141 Hinge
142 Housing
143 Ear hooking portion
144 Contacted portion
150 Control unit
151 Wiring
160 Electronic component
200 Coil spring

What is claimed is:

1. An eyewear, comprising:
a lens including an electrical element;
a frame which holds the lens and is partially formed hollow;
a control unit for controlling the electrical element; an electronic component electrically connected to the control unit via wiring; and
a hollow member which is disposed within the frame in a state of housing the wiring therein and deforms by following deformation of the frame, wherein
the hollow member is disposed within a temple,
the temple includes an ear hooking portion including a bent portion, and the hollow member is disposed at the bent portion, and
the hollow member has an elastic deformation region that elastically deforms by following the deformation of the frame in a predetermined range including the bent portion of the ear hooking portion of the temple, and has an inelastic deformation region that deforms by following the deformation of the frame in a range other than the predetermined range including the bent portion of the ear hooking portion of the temple.

2. The eyewear according to claim 1, wherein the hollow member elastically deforms by following the deformation of the frame.

3. The eyewear according to claim 1, wherein the hollow member is formed of metal.

4. The eyewear according to claim 1, wherein the hollow member is a coil spring.

5. The eyewear according to claim 1, wherein: the elastic deformation region is formed of a coil spring, the inelastic deformation region is formed of a metal pipe, and the elastic deformation region and the inelastic deformation region are connected to each other.

6. The eyewear according to claim 1, wherein the electronic component is an electric power source for supplying electric power to the control unit.

7. The eyewear according to claim 1, wherein the electronic component is a sensor for acquiring body information of a user of the eyewear.

* * * * *